United States Patent
Kikuchi et al.

(10) Patent No.: US 6,328,784 B1
(45) Date of Patent: Dec. 11, 2001

(54) METHOD OF DESULFURIZING MOLTEN IRON ALLOY

(75) Inventors: Naoki Kikuchi; Shuji Takeuchi; Mototatsu Sugizawa; Shigeru Ogura, all of Chiba (JP)

(73) Assignee: Kawasaki Corporation, Hyogo (JP)

( * ) Notice: Subject to any disclaimer, the term of this patent is extended or adjusted under 35 U.S.C. 154(b) by 0 days.

(21) Appl. No.: 09/605,741

(22) Filed: Jun. 29, 2000

(30) Foreign Application Priority Data

Jul. 5, 1999 (JP) .................................................. 11-190572

(51) Int. Cl.$^7$ ...................................................... C21C 1/02
(52) U.S. Cl. .................................................. 75/529; 75/532
(58) Field of Search ....................................... 75/529, 532

(56) References Cited

U.S. PATENT DOCUMENTS 3,772,000 * 11/1973 Hyde et al. .............................. 75/529
3,876,421    4/1975 Takemura .

FOREIGN PATENT DOCUMENTS 55-76005 * 6/1980 (JP) .
2000-001710 * 7/2000 (JP) .

OTHER PUBLICATIONS

Noelle et al., "Behandlung von Roheisen mit Kalk und Erdgas zum Einstellen niedriger Schwefel—und Stickstoffgehalte", XP–002165463, vol. 92, No. 22, 1972, pp. 1085–1093.
XP–002165464, "Desulphurise Pig Iron Calcium Oxide Improve Efficiency Blow Gas Hydrocarbon". Oct. 1972.

* cited by examiner

Primary Examiner—Roy King
Assistant Examiner—Tima McGuthry-Banks
(74) Attorney, Agent, or Firm—Young & Thompson

(57) ABSTRACT

A process for desulfurizing a molten iron alloy in which a desulfurizing agent is applied to the molten iron alloy under agitation. Concurrently, a gas containing a hydrocarbon gas is blown onto the bath surface of the molten iron alloy, or a substance generating a hydrocarbon gas is added to the bath surface.

11 Claims, 2 Drawing Sheets

US 6,328,784 B1

METHOD OF DESULFURIZING MOLTEN IRON ALLOY

BACKGROUND OF THE INVENTION

1. Field of the Invention

The present invention relates to a desulfurizing method for removing a sulfur component from a molten iron alloy.

2. Description of the Related Art

The need for high quality steel has generated a demand for low-sulfur steel. There are two types of processes for removing sulfur (hereinafter referred to as desulfurization); one carried out during the molten (pig) iron stage in a torpedo car or a molten-iron pan, and the other carried out in the molten-steel stage on dioxidized molten steel downstream of a converter. The former is the most prevalent desulfurization process today due to improved molten-iron pretreatment techniques.

Desulfurization in the molten-iron stage employs a CaO-based desulfurizing agent, an $Na_2O$-based desulfurizing agent, an Mg-based desulfurizing agent, or similar suitable agent. The CaO-based desulfurizing agent is preferred the cost and ease of slag treatment after desulfurization. To this end, an improved process for desulfurizing molten iron with a CaO-based desulfurizing agent is desired.

A known process for desulfurizing molten iron with a CaO-based desulfurizing agent uses a rotating agitator to draw the desulfurizing agent into the molten iron.

Japanese Unexamined Patent Application Publication No. 55-76005 discloses a method of accelerating the desulfurizing reaction in which a hydrocarbon gas is blown into the molten iron through the agitator. However, as a result of studying the disclosed method in detail the inventors found that the hydrocarbon gas blown into the molten iron through the agitator is concentrated at the center of rotation due to a density difference between the molten iron and the gas.

This technique also increased the cost of the process because a passage for the hydrocarbon gas must be provided in the agitator and special piping and joints are required to supply the gas to the agitator, which is a rotating body.

Japanese Unexamined Patent Application Publication No. 8-337807 discloses a method of accelerating the desulfurizing reaction by simultaneously blowing a powdery desulfurizing agent into molten iron and blowing a reducing gas onto the bath surface of the molten iron. However, the surface area in which the desulfurizing agent floats is variable depending on ablation of a lance used for blowing the desulfurizing agent or deposition of the metal or slag. This presents the problem of precisely blowing the reducing gas to the area in which the desulfurizing agent floats.

SUMMARY OF THE INVENTION

An object of the present invention is to provide a highly efficient desulfurizing method for desulfurizing a molten iron alloy such as molten pig iron that avoids the above-noted problems.

To achieve this objective, the present invention provides a method of desulfurizing a molten iron alloy in which a desulfurizing agent is applied to the molten iron alloy from above a bath surface of the molten iron alloy, the molten iron alloy is agitated, and, while the molten iron alloy is being agitated, a gas containing a hydrocarbon gas is blown onto the bath surface of the molten iron alloy or a substance generating a hydrocarbon gas is added to the bath surface of the molten iron alloy.

Preferably the gas containing the hydrocarbon gas is blown so that the hydrocarbon gas is introduced at a rate not less than 3 Nl/minute per ton of molten iron alloy. The hydrocarbon gas preferably is a coke oven gas.

The substance generating the hydrocarbon gas preferably is heavy oil or coal, or is a substance that is produced through heat treatment or dry distillation treatment, and contains carbon as a main component. The substance generating the hydrocarbon gas is added such that, when calculated as an amount of hydrocarbon gas per ton of the molten iron alloy, not less than 3 Nl/minute of the hydrocarbon gas is generated.

DESCRIPTION OF PREFERRED EMBODIMENTS

Figure 1:
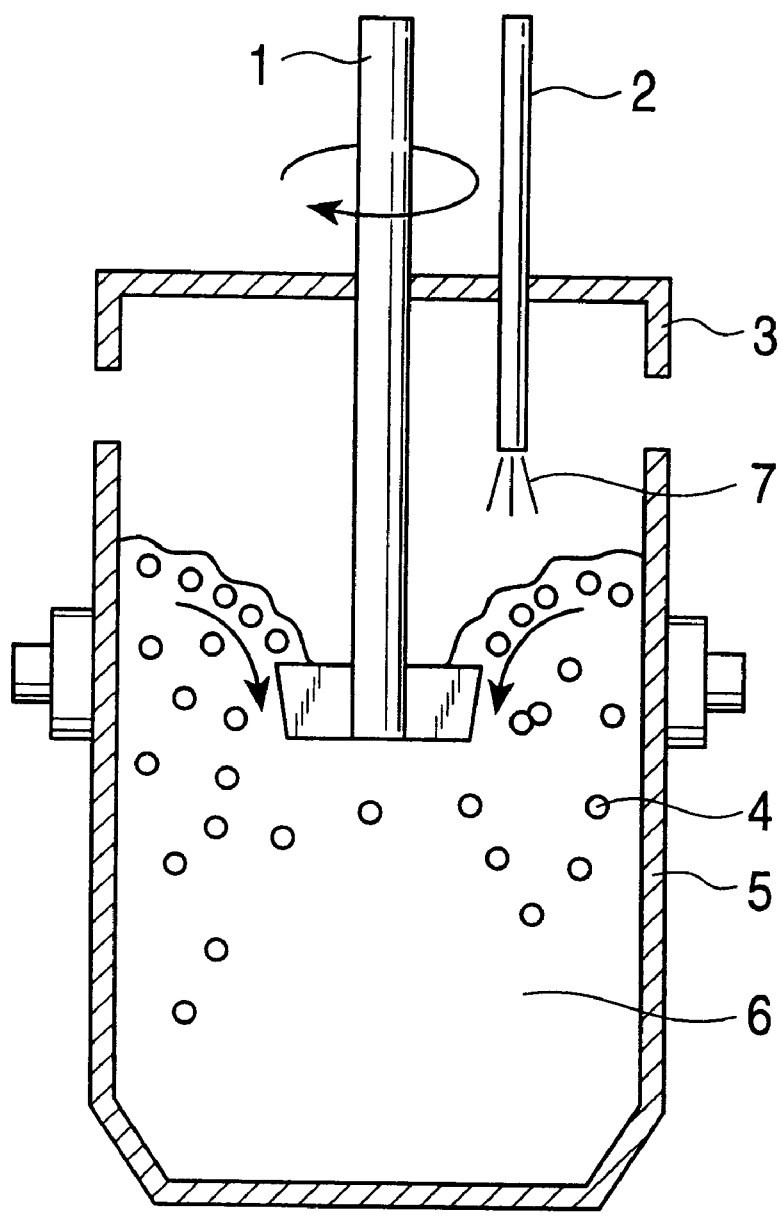
FIG. 1 is a sectional view showing a principal part of an apparatus for implementing the desulfurizing method of the present invention.

With reference to FIG. 1, a desulfurizing agent 4 is applied to a molten iron alloy 6 from above the bath surface of the molten iron alloy 6 in a container 5, and simultaneously the molten iron alloy 6 is agitated by an agitator 1 immersed therein. While agitating the molten iron alloy 6, a gas 7 containing a hydrocarbon gas is blown onto the bath surface of the molten iron alloy 6 through a lance 2.

Although a rotary agitator is shown as the agitator 1 in FIG. 1, the present invention is not limited to a rotary agitator and any type of agitator capable of suitably agitating the molten iron alloy 6 can be used.

The desulfurizing agent 4 applied from above the bath surface of the molten iron alloy 6 is drawn into the molten iron alloy 6 under agitation by the agitator 1. The reaction interface between the molten iron alloy 6 and the desulfurizing agent 4 is therefore increased to improve the efficiency of the desulfurizing process.

A CaO-based desulfurizing agent, an $Na_2O$-based desulfurizing agent, an Mg-based desulfurizing agent, or other suitable agent may be employed as the desulfurizing agent 4. The CaO-based desulfurizing agent is preferred due to the cost and ease of slag treatment after desulfurization.

Generally, the desulfurizing reaction effected by a CaO-based desulfurizing agent is expressed by formula (1). In formula (1), [S] and [O] denotes respectively S and O the molten iron alloy 6. Also, (CaS) in formula (1) denotes CaS removed with slag. The desulfurizing reaction of formula (1) is a reducing reaction and is accelerated by maintaining a reducing atmosphere at the reaction interface.

$$[S]+CaO \rightarrow (CaS)+[O] \qquad (1)$$

Hydrocarbon gas decomposes perfectly at about 300° C. to produce hydrogen gas. The decomposing reaction of hydrocarbon gas is expressed by formula (2):

$$C_nH_m \rightarrow nC+m/2H_2 \qquad (2)$$

Hydrogen gas generated upon decomposition of hydrocarbon gas reacts with oxygen in the atmosphere gas or oxygen in the molten iron alloy 6 and creates a reducing atmosphere in the system to accelerate the desulfurizing reaction. The reaction between hydrogen gas and oxygen is expressed by formulae (3) and (4):

$$1/2O_2+H_2 \rightarrow H_2O \qquad (3)$$

$$[O]+H_2 \rightarrow H_2O \qquad (4)$$

The deoxidizing reaction effected by hydrocarbon is expressed by formula (5). Comparing formulae (4) and (5), the equilibrium [O] concentration is lower in formula (5). This means that $C_nH_m$ requires higher free energy to generate than $H_2$; that is, the covalent bonding energy of C—H is greater than that of H—H. By employing hydrocarbon, therefore, stronger reducing power is realized, which is advantageous in accelerating the desulfurizing reaction.

$$[O]+C_nH_m \rightarrow nC+m/2H_2O \quad (5)$$

When the molten iron alloy 6 is mechanically agitated by the agitator 1, the molten iron alloy 6 flows as indicated by arrows in FIG. 1. When the molten iron alloy 6 flows in this manner, the desulfurizing agent 4 applied from above the bath surface of the molten iron alloy 6 is drawn into the molten iron alloy 6 and is forced to circulate therein. As a result, the reaction efficiency is higher than achieved by simply blowing on the desulfurizing agent.

Further, the bath surface of the molten iron alloy 6 is essentially covered with the hydrocarbon gas as result of blowing a gas containing a hydrocarbon gas to the bath surface or by adding a substance that generates a hydrocarbon gas. Since the bath surface of the molten iron alloy 6 always changes as the alloy is agitated, the reducing reaction effected by hydrocarbon at the bath surface of the molten iron alloy 6 accelerates and the reaction efficiency of the desulfurizing agent improves.

Various kinds of gas may be blown onto the bath surface of the molten iron alloy 6. For example, a gas containing propane gas, methane gas or the like may be used, although a coke oven gas that is generated when carbonizing coal in a coke oven of an iron mill is preferred because the coke oven gas contains, as main components, large amounts of $H_2$ and $CH_4$.

Various kinds of substances may be used to generate the hydrocarbon gas that is added to the bath surface of the molten iron alloy 6. Any kind of substance capable of generating a hydrocarbon gas at the temperature of the molten iron alloy 6 is usable, although coal is preferred because coal contains 10–40 wt % of volatile matter comprising C and H. This volatile matter is completely volatilized at about 800° C. By adding coal to the bath surface of the molten iron alloy 6, therefore, the volatile matter is volatilized to generate a gas having similar components to those of the coke oven gas. Accordingly, a similar advantage to that achieved when blowing the coke oven gas to the bath surface of the molten iron alloy 6 is obtained by adding coal to the bath surface of the molten iron alloy 6.

From the viewpoint of environmental protection, the substance generating the hydrocarbon gas may be a substance that is produced from general wastes, industrial wastes such as chemical product wastes, municipal refuse, etc. through heat treatment or carbonization treatment, and contains carbon as a main component. The thus-produced substance has about 50 wt % of carbon content and contains volatile matter similar to that found in coal, and therefore can provide a similar advantage.

Because heavy oil generates a hydrocarbon gas at high temperatures, it can also be employed as the substance generating the hydrocarbon gas.

Further, the molten iron alloy 6 used in the present invention is not limited to molten pig iron, and may be a high-carbon ferroalloy such as molten ferrochromium, molten steel, molten pure iron, etc.

EXAMPLE 1

Distillation and dry-distillation experiments were conducted on substances listed in Table 1 to study the amount of hydrocarbon gas generated from each substance.

The process of desulfurizing molten iron was implemented by using, as the container 5, a molten-iron pan with a capacity of 300 tons. A rotary agitator was disposed at the center of the molten-iron pan. Conditions of the desulfurizing process are listed in Table 2. Considering the amount of generated hydrocarbon gas shown in Table 1, the rate at which each substance was added was selected such that 10 Nl/minute of hydrocarbon gas was added per ton of the molten iron.

In the case of blowing a coke oven gas to the bath surface, for example, the blowing rate was 4300 Ni/minute, the amount of generated hydrocarbon gas was 70 vol %, and the throughput (amount of processed molten iron) was 300 tons. The amount of hydrocarbon gas blown per ton of the molten iron was given by:

4300 Nl/minute×0.7÷300=10 Nl/minute.

When the gas 7 containing the hydrocarbon gas was blown to the bath surface of the molten iron, the fore end of the lance 2 was located at each of four positions that were horizontally spaced 150 mm and 1500 mm from the center of the molten-iron pan and elevated 150 mm and 2000 mm above the bath surface in the static state.

The substance generating the hydrocarbon gas was added to the bath surface of the molten iron at each of two positions that were horizontally spaced 150 mm and 1500 mm from the center of the molten-iron pan. Those positions are listed in Table 3.

The desulfurizing process of the molten iron was performed under the conditions listed in Table 2, and the sulfur content of the molten iron before and after the desulfurization were measured. In the case of blowing a coke oven gas or propane gas to the bath surface, the fore end of the lance 2 was located at each of four positions (A–D) shown in Table 3. In the case of adding heavy oil, coal and carbonized municipal refuse to the bath surface, the substance was added at each of two positions (E and F) shown in Table 3.

As a comparative example, the desulfurizing process of the molten iron was performed without adding the hydrocarbon gas, and the sulfur contents of the molten iron before and after the desulfurization were measured. The results are listed in Table 4.

In the case of blowing the coke oven gas or propane gas onto the bath surface, the desulfurizing effect is increased when the blowing position is closer to the center of the molten-iron pan and closer to the bath surface. In the case of adding a liquid such as heavy oil or a solid such as coal to the bath surface, the desulfurizing effect is increased when the adding position is closer to the center of the molten-iron pan.

More specifically, by rotating blades of the agitator 1, the molten iron is forced to flow toward the center of the container 5 at the bath surface, and then flow toward the inside of the bath after reaching the center of the container 5. By blowing the gas 7 containing the hydrocarbon gas to the bath surface at a position close to the center of the container 5, or by adding the substance generating the hydrocarbon gas to the bath surface at a position close to the center of the container 5, the bath surface is essentially covered with the hydrocarbon gas. As a result, the desulfurizing reaction is accelerated.

Figure 2:
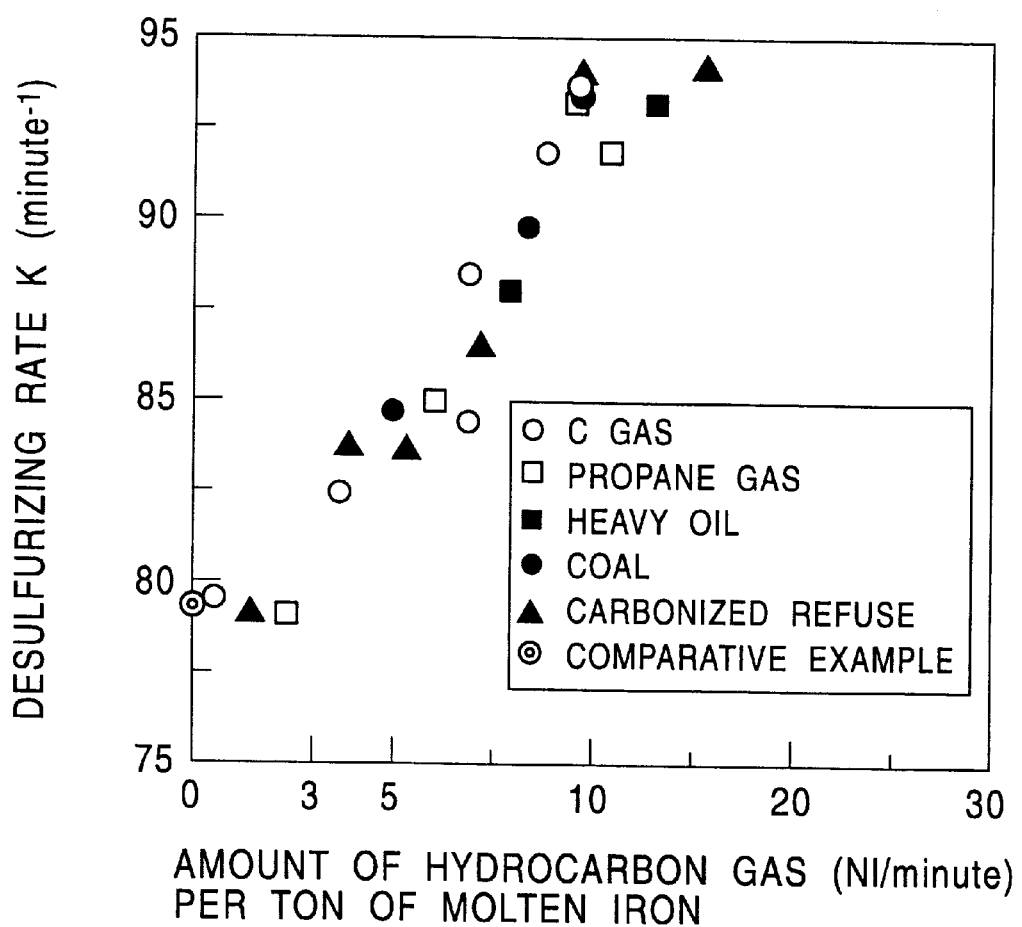
FIG. 2 is a graph showing the relationship between the amount of a hydrocarbon gas per ton of molten iron and the desulfurizing rate.

Next, the relationship between the amount of added hydrocarbon gas and the desulfurizing rate constant K was examined by changing the amount of hydrocarbon gas blown or added at the positions A and E where the greatest desulfurizing effect was developed. The results are plotted in FIG. 2. The horizontal axis of FIG. 2 represents the amount of hydrocarbon gas per ton of the molten iron.

Specifically, values represented by the horizontal axis FIG. 2 were determined as follows. In the case of blowing the gas containing the hydrocarbon gas, the amount of hydrocarbon gas per ton of the molten iron was calculated from the amount of hydrocarbon gas contained in the blown gas. In the case of adding the substance generating the hydrocarbon gas, the amount of hydrocarbon gas per ton of the molten iron was calculated from the amount of hydrocarbon gas generated from the added substance.

The vertical axis represents the desulfurizing rate constant K, which is expressed by formula (6):

$$K(\text{minute}^{-1}) = -\ln([S]_f/[S]_i)/t_f \qquad (6)$$

where

[S]$_f$ is the S content (wt %) after desulfurization,
[S]$_i$ is the S content (wt %) before desulfurization, and
$t_f$ is the processing time (minutes).

As seen from FIG. 2, the desulfurizing rate is improved when the amount of hydrocarbon gas per ton of the molten iron is not less than 3 Nl/minute, regardless of the type of the gas containing the hydrocarbon gas and the substance generating the hydrocarbon gas. Accordingly, the amount of hydrocarbon gas per ton of the molten iron is preferably not less than 3 Nl/minute.

Further, for the cases of blowing the coke oven gas to the bath surface of the molten iron and adding coal to the bath surface of the molten iron, the oxygen concentration in the atmosphere gas and the oxygen partial pressure in the molten iron were measured using an oxygen sensor. Measured results are listed in Table 5.

As seen from Table 5, the oxygen concentration in the atmosphere gas and the oxygen partial pressure in the molten iron are both reduced by blowing the coke oven gas to the bath surface and adding coal to the bath surface compared to the comparative example. In other words, using the hydrocarbon gas makes it possible to improve the desulfurization efficiency and to reduce sulfur remaining in the molten iron. This is because the oxygen partial pressure is lowered at the reaction interface between the molten iron and the desulfurizing agent, and hence the desulfurizing reaction is accelerated.

Problems such as scattering or ejection of the molten iron did not occur during the desulfurizing process.

While the desulfurizing process of the molten iron has been described with particularity in Example 1, the present invention is also applicable to a high-carbon ferroalloy such as molten ferrochromium, molten steel, molten pure iron, and the like.

According to the present invention, it is possible in the desulfurizing process of a molten iron alloy to improve the desulfurization efficiency, increase the productivity of iron alloys having a low sulfur content, reduce the amount of slag generated, and reduce the cost of the desulfurizing process.

While the present invention has been described in connection with certain preferred embodiments, it is to be understood that the invention is defined by the accompanying claims, when read in light of the specification, including the drawings, and equivalents thereof.

TABLE 1

|  | Amount of Generated Hydrocarbon Gas |
|---|---|
| Coke Furnace Gas | 70 vol % |
| Propane Gas | 100 vol % |
| Heavy Oil | 1400 N l/kg |
| Coal | 300 N l/kg |
| Carbonized Refuse | 200 N l/kg |

TABLE 2

| Agitator | Shape | 4 blades |
|---|---|---|
|  | Number of Revolutions | 150 rpm |
| Desulfurizing Agent | Composition | CaO + 5 wt % CaF$_2$ |
|  | Grain Size | not more than 125 μm |
|  | Amount of Added Agent | 7.5 kg per ton of molten iron |
|  | Adding Time | 3 minutes from start of stirring |
| Molten Iron | Throughput | 300 t |
|  | Composition before Desulfurization | C: 4.0 wt %, Si: tr, Mn: 0.20 wt %, P: 0.030–0.050 wt % |
| Method of Adding Hydrocarbon Gas | Bath Surface Blowing of Coke Furnace Gas | blowing rate 4300 N l/min |
|  | Bath Surface Blowing of Propane Gas | blowing rate 3000 N l/min |
|  | Bath Surface Addition of Heavy Oil | adding rate 2.1 kg/min |
|  | Bath Surface Addition of Coal | adding rate 10 kg/min |
|  | Bath Surface Addition of Carbonized Municipal Refuse | adding rate 15 kg/min |

TABLE 3

| | Method of Adding Hydrocarbon Gas | Adding Position |
|---|---|---|
| A | bath surface blowing of gas containing hydrocarbon gas | blown from position horizontally spaced 150 mm from container center and elevated 150 mm above bath surface in static state |
| B | bath surface blowing of gas containing hydrocarbon gas | blown from position horizontally spaced 1500 mm from container center and elevated 150 mm above bath surface in static state |
| C | bath surface blowing of gas containing hydrocarbon gas | blown from position horizontally spaced 150 mm from container center and elevated 2000 mm above bath surface in static state |
| D | bath surface blowing of gas containing hydrocarbon gas | blown from position horizontally spaced 1500 mm from container center and elevated 2000 mm above bath surface in static state |
| E | bath surface addition of substance generating hydrocarbon gas | added to bath surface at position horizontally spaced 150 mm from container center |

TABLE 3-continued

| Method of Adding Hydrocarbon Gas | | Adding Position |
|---|---|---|
| F | bath surface addition of substance generating hydrocarbon gas | added to bath surface at position horizontally spaced 1500 mm from container center |

TABLE 4

| Method of Adding Hydrocarbon Gas | Adding Position | Molten Iron Temperature at Start of Desulfurization (° C.) | Molten Iron Temperature at End of Desulfurization (° C.) | S Content of Molten Iron Before Desulfurization (wt %) | S Content of Molten Iron After Desulfurization (wt %) | Remarks |
|---|---|---|---|---|---|---|
| Bath Surface Blowing of Coke Furnace Gas | A | 1351 | 1318 | 0.030 | 0.0019 | Inventive Example |
| | B | 1353 | 1311 | 0.030 | 0.0038 | Inventive Example |
| | C | 1348 | 1314 | 0.030 | 0.0058 | Inventive Example |
| | D | 1355 | 1316 | 0.031 | 0.0062 | Inventive Example |
| Bath Surface Blowing of Propane Gas | A | 1349 | 1319 | 0.031 | 0.0021 | Inventive Example |
| | B | 1352 | 1316 | 0.031 | 0.0040 | Inventive Example |
| | C | 1348 | 1321 | 0.030 | 0.0061 | Inventive Example |
| | D | 1349 | 1312 | 0.021 | 0.0066 | Inventive Example |
| Bath Surface Addition of Heavy Oil | E | 1355 | 1317 | 0.033 | 0.0020 | Inventive Example |
| | F | 1352 | 1313 | 0.032 | 0.0036 | Inventive Example |
| Bath Surface Addition of Coal | E | 1353 | 1310 | 0.032 | 0.0022 | Inventive Example |
| | F | 1352 | 1316 | 0.030 | 0.0041 | Inventive Example |
| Bath Surface Addition of Carbonized Municipal Refuse | E | 1348 | 1321 | 0.030 | 0.0019 | Inventive Example |
| | F | 1349 | 1320 | 0.031 | 0.0045 | Inventive Example |
| No addition of Hydrocarbon Gas | — | 1350 | 1315 | 0.029 | 0.0070 | Comparative Example |

TABLE 5

| Method of Adding Hydrocarbon Gas | Adding Position | Oxygen Concentration in Atmosphere Gas (vol %) | Oxygen Partial Pressure in Molten Iron (log $P_{O_2}$) | Remarks |
|---|---|---|---|---|
| Bath Surface Blowing of Coke Furnace Gas | A | 3–5 | −18.2 | Inventive Example |
| Bath Surface Addition of Coal | E | 6–9 | −17.5 | Inventive Example |
| No addition of Hydrocarbon Gas | — | 15–20 | −16 | Inventive Example |

What is claimed is:

1. A method of desulfurizing a molten iron alloy, the method comprising the steps of:

applying a desulfurizing agent to a bath surface of a molten iron alloy in a container;

agitating the molten iron alloy in the container; and while the molten iron alloy is being agitated, blowing a gas containing a hydrocarbon gas onto the bath surface of the molten iron alloy.

2. The method of claim 1, wherein the gas containing the hydrocarbon gas is blown so that a flow rate of the hydrocarbon gas is not less than 3 Nl/minute per ton of the molten iron alloy.

3. The method of claim 1, wherein the gas containing the hydrocarbon gas is a coke oven gas.

4. The method of claim 1, wherein the gas is blown onto the bath surface immediately adjacent to a center of the bath surface.

5. The method of claim 4, wherein the molten iron alloy is agitated by forcing the molten iron alloy at the bath surface to flow toward the center of the bath surface and then to flow down into the interior of the molten iron alloy in the container.

6. A method of desulfurizing a molten iron alloy, the method comprising the steps of:

applying a desulfurizing agent to a bath surface of a molten iron alloy in a container;

agitating the molten iron alloy in the container; and while the molten iron alloy is being agitated, adding a substance generating a hydrocarbon gas to the bath surface of the molten iron alloy.

7. The method of claim 6, wherein the substance generating the hydrocarbon gas is heavy oil or coal.

8. The method of claim 6, wherein the substance generating the hydrocarbon gas is a substance that is produced through heat treatment or dry distillation treatment, and contains carbon as a main component.

9. The method of claim 6, wherein the substance generating the hydrocarbon gas is added so that not less than 3 Nl/minute of the hydrocarbon gas is generated per ton of the molten iron alloy.

10. The method of claim 6, wherein the substance is added to the bath surface immediately adjacent to a center of the bath surface.

11. The method of claim 6, wherein the molten iron alloy is agitated by forcing the molten iron alloy at the bath surface to flow toward the center of the bath surface and then to flow down into the interior of the molten iron alloy in the container.

* * * * *